United States Patent Office 3,510,531
Patented May 5, 1970

3,510,531
PREPARATION OF NITROOLEFINS
John M. Larkin, Hopewell Junction, and Kenneth L. Kreuz, Fishkill, N.Y., assignors to Texaco Inc., New York, N.Y., a corporation of Delaware
No Drawing. Filed Dec. 18, 1967, Ser. No. 691,122
Int. Cl. C07c 79/06
U.S. Cl. 260—644    21 Claims

ABSTRACT OF THE DISCLOSURE

A method of preparing a nitroolefin having at least two carbon atoms by contacting a vicinal nitroalkyl nitrate having at least two carbon atoms corresponding to the formula:

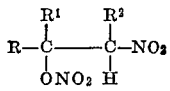

with a nitric acid acceptor in a non-aqueous medium thereby forming a nitroolefin of the formula:

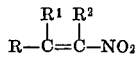

The contemplated nitroolefins are useful as fungicides, lubricant additives, fuel additives and as intermediates in the preparation of herbicides, nematocides, detergents, dyestuffs, pigments and pharmaceutical agents.

---

This invention relates to a method for preparing nitroolefins from vicinal nitroalkyl nitrates. In particular, this invention relates to a method for preparing nitroolefinic compounds wherein the nitro group is positioned on an unsaturated olefinic carbon by contacting a vicinal nitroalkyl nitrate with a nitric acid acceptor.

Known methods for the preparation of nitroolefins have included the conversion of crude nitronitrite-dinitroparaffin mixtures by the use of ammonia or urea under anhydrous conditions. Likewise, dinitroparaffins have been converted to nitroolefins by employing aqueous slurries of alkaline earth oxides. Recently it has been proposed to prepare nitroolefins from dinitroparaffins or nitroalcohols or nitronitrites by contacting the nitrocompound with catalytic amounts of alumina or alumina containing catalysts. Although the heretofore employed procedures have produced nitroolefins in varying degrees, they were nevertheless formed in relatively poor yields and in admixture with other products presenting isolation and purification difficulties. In this connection the nitrocompounds were mixtures of the vinyl nitrocompound along with the allylic nitroisomers. Moreover, the prior art procedures resulted in the formation of substantial amounts of polynitroolefins.

It is therefore an object of this invention to provide a method for the preparation of nitroolefinic compounds.

It is another object of this invention to provide a method for the preparation of nitroolefins from vicinal nitroalkyl nitrates.

Yet another object of this invention is to provide a method for the preparation of nitroolefins, wherein the nitro group is positioned on an unsaturated olefinic carbon, from vicinal nitroalkyl nitrates in high yields.

A still further object of this invention is to provide a method for the preparation of nitroolefins from vicinal nitroalkyl nitrates in a relatively pure state without the necessity of utilizing complicated and expensive purification procedures.

Other objects and advantages will become apparent from a reading of the following detailed description and examples.

Broadly, this invention contemplates a method of preparing a nitroolefin having at least two carbon atoms which comprises providing a vicinal nitroalkyl nitrate having at least two carbon atoms and reacting said nitrate in a non-aqueous medium with a nitric acid acceptor.

According to this invention the contemplated nitroolefins correspond to the formula:

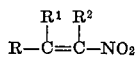

where R is a hydrogen or an alkyl group having from 1 to 100 and preferably from 1 to 22 carbon atoms and where $R^1$ and $R^2$ are hydrogen or alkyl groups having from 1 to 22 and preferably from 1 to 10 carbon atoms.

Vicinal nitroalkyl nitrates contemplated as starting materials in the instant invention include for example 2-nitroethyl nitrate, 1-nitro-2-propyl nitrate, 1-nitro-2,4,4-trimethyl-2-pentyl nitrate, 1-nitro-2-pentyl nitrate, 1-nitro-2-methyl-2-hexyl nitrate, 1-nitro-4-methyl-2-pentyl nitrate, 1-nitro-2-pentyl nitrate, 1-nitro-2-hexyl nitrate, mixtures of 4-nitro-5-nonyl nitrate and 5-nitro-4-nonyl nitrate, 1-nitro-2-dodecyl nitrate, mixtures of 7-nitro-8-pentadecyl nitrate and 8-nitro-7-pentadecyl nitrate, 1-nitro-2-octadecyl nitrate, mixtures of 3-nitro-4-eicosyl nitrate and 4-nitro-3-eicosyl nitrate, 1-nitro-2-docosyl nitrate, 2-nitro-1-butyl-1-cyclopentyl nitrate, 1 - carboxy-8-nitro-9-heptadecyl nitrate, 1-carboxy-9-nitro-8-heptadecyl nitrate and 11-nitro-12-methyl-12-docosyl nitrate. Mixtures of vicinal nitroalkyl nitrates is similarly contemplated.

The vicinal nitroalkyl nitrates reacted to nitroolefins in accordance with this invention may be prepared by the procedure described in U.S. Patent 3,282,983. According to this procedure an alkene is contacted simultaneously with dinitrogen tetroxide and oxygen at a temperature of between −40 and 20° C. to form a nitroalkyl peroxynitrate. The intermediate nitroalkyl peroxynitrate is thereafter contacted with a reducing agent at a temperature of between −20 and 30° C. to form the vicinal nitroalkyl nitrate. The vicinal nitroalkyl nitrate precursor contemplated in the instant invention corresponds to the formula:

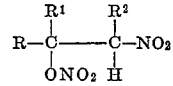

where R is hydrogen or an alkyl radical having from 1 to 100 and preferably from 1 to 22 carbon atoms and where $R^1$ and $R^2$ are hydrogen or alkyl radicals having from 1 to 22 and preferably from 1 to 10 carbon atoms.

Conversion of the vicinal nitroalkyl nitrate precursor employed in the instant invention to the corresponding nitroolefin is accomplished by reacting the hereinabove defined nitrate with a nitric acid acceptor in a non-aqueous medium at temperatures ranging from at least −40° C. up to a temperature of approximately 300° C., preferably from about 0° C. to 180° C. for periods ranging from a few seconds, about 2 seconds, to 24 hours or longer.

Among the nitric acid acceptors contemplated in the instant invention we mention oxides, hydroxides and salts of weak acids of the metals of Groups I-A, I-B, II-A, III-A, VII-B and VIII of the Periodic Table. Illustrative of the contemplated acceptors are sodium acetate, sodium carbonate, sodium bicarbonate, sodium hydroxide, potassium hydroxide, potassium acetate, potassium stearate, magnesium oxide, magnesium oxalate, calcium oxide, calcium carbonate, calcium octanoate, strontium oxide, strontium acetate, barium oxide, barium hydroxide, barium carbonate, barium stearate, copper stearate, cupric oxide, aluminum hydroxide, alumina hydrates, aluminum acetate, manganese acetate, manganese carbonate, cobalt acetate and cobalt hydroxide. Other applicable nitric acid acceptors include basic nitrogen compounds illustrated by ammonia, amines, such as triethylamine and triethanolamine, quaternary ammonium hydroxides and salts such as benzyltrimethylammonium hydroxide and its acetate, heterocyclic nitrogen compounds such as quinoline and pyridine phenols and bisphenols such as phenol, 2,6-di-t-butyl-4-methyl-phenol 2,6-di-t-butyl-4-hexylphenol, 4,4'-dihydroxy-3,3',5,5'-di-t-butyl diphenylmethane and olefins such as 1-octene, 1 - dodecene, 2,4,4-trimethyl-1-pentene and cyclohexene. Particularly preferred nitric acid acceptors are aluminum hydroxide, alumina hydrates and $C_6$ to $C_{15}$ olefins such as 1-octene and 2,4,4-trimethyl-1-pentene. The amount of nitric acid acceptor employed in the instant invention ranges from about 1 to 25 and preferably from about 1 to 5 moles of acceptor per mole of nitronitrate.

In combination with the above nitric acid acceptor, the reaction is conducted under the prescribed temperature conditions outlined above in a non-aqueous medium wherein the nitronitrate is at least slightly soluble to facilitate the reaction. Appropriate media include a wide range of $C_5$ to $C_{18}$ hydrocarbons including hexane, heptane, octane, nonane, dodecane, 1-octene, 1-dodecene, 2,4,4-trimethyl-1-pentene, benzene, toluene, xylene, halohydrocarbons such as ortho-dichlorobenzene, chlorobenzene, and perhalogenated alkanes where the halogen is fluorine. Hydrophilic organic media such as alcohols, dimethylformamide, dimethylsulfoxide, tetrahydrofuran, dioxane, etc. may be employed provided they are substantially free of water i.e. that the medium contain not more than about 5% and preferably not more than about 2% water. Water if present in an amount exceeding that specified above is deleterious to the reaction in that side reactions are promoted including the hydration of the nitroolefin to the alcohol along with polymerization of the nitroolefin. In general the reaction is carried out in the presence of a non-aqueous medium comprising from about 0.1 to 50 weight percent nitrate, preferably at a concentration ranging from about 2 to 20 weight percent. Where an olefin is employed in the dual capacity of acceptor and medium the amount of olefin employed may correspond to the cumulative amounts of acceptor and medium specified above.

Specific examples of nitroolefins prepared according to the inventive process include nitroethylene, 1-nitro-1-propene, 1-nitro-1-butene, 2-nitro-2-butene, 1-nitro-4-methyl - 1 - pentane, 1-nitro-2,4,4-trimethyl-1-pentene, 1-nitro - 1 - pentene, 3-nitro-2-methyl-2-pentene, 1-nitro-2-methyl-1-hexene, 1-nitro-1-octene, 4-nitro-4-nonene, 5-nitro - 4-nonene, 1-nitro-1-dodecene, 7-nitro-7-pentadecene, 8-nitro-7-pentadecene, 1-nitro-1-octadecene, 3-nitro-3-eicosene, 4-nitro-3-eicosene and 11-nitro-12-methyl-11-docosene.

The nitroolefins prepared according to this invention are useful as fungicides, lubricant additives, fuel additives, and plasticizers. Further they are useful as intermediates in the preparation of herbicides, nematocides, detergents, dyestuffs, pigments and pharmaceutical agents.

In order to more fully illustrate the nature of our invention and the manner of practicing the same the following examples are presented.

EXAMPLE I

To a solution of 5.6 grams (0.05 mole) of 2,4,4-trimethyl-1-pentene in 55 milliliters of carbon tetrachloride maintained at 0° C. there was simultaneously added over a period of 4¾ hours 3.1 milliliters (0.05 mole) of dinitrogen tetroxide and 60.5 milliliters per minute of oxygen. The system was thereafter flushed with nitrogen and the contents cooled to approximately −5 to −10° C. Nitric oxide was bubbled through the solution at the rate of 60.5 milliliters per minute for 22 minutes. The resulting blue-green solution was stirred at approximately −10° for an additional 15 minutes. The solvent was subsequently removed under vacuum at room temperature. 10.79 grams of 1-nitro-2,4,4-trimethyl-2-pentyl nitrate was recovered.

To a solution of 2.35 grams of 1-nitro-2,4,4-trimethyl-2-pentyl nitrate prepared above in 50 milliliters of benzene, there was added 8 grams of alumina hydrate (so called gamma prepared by heating the mono hydrate at 250° C.). After mixing, the material was permitted to stand undisturbed for a period of 18 hours. The alumina was thereafter separated by filtration and the solvent removed under vacuum at 35° C. 1.47 grams of a yellow liquid was recovered and identified as 1-nitro-2,4,4-trimethyl-1-pentene by infrared.

EXAMPLE II

To a stirred solution of 11.2 grams (0.1 mole) of 1-octene in 55 milliliters of carbon tetrachloride maintained at 0° C. there was simultaneously introduced over a period of six hours 6.2 milliliters (0.1 mole) of dinitrogen tetroxide and 60.5 milliliters per minute of oxygen. The colorless solution was flushed with nitrogen and cooled to −10 to −20° C. While the solution was stirred at this temperature, nitric oxide was bubbled in at the rate of 60.5 milliliters per minute for 38 minutes. The resulting blue-green solution was permitted to warm to room temperature and the solvent removed under vacuum 21.62 grams (98% yield) of a yellow oil identified as 1-nitro-2-octyl nitrate was recovered.

To a solution of 2.0 grams of 1-nitro-2-octyl nitrate in 50 milliliters of benzene there was added 8 grams of alumina hydrate as in Example I. After mixing, the material was permitted to remain undisturbed for 3 days whereupon the alumina was removed by filtration and the solvent removed under vacuum at 35° C. 1.27 grams (89% yield) of 1-nitro-1-octene was recovered and identified by infrared.

EXAMPLE III

A solution of 0.55 gram of 1-nitro-2-octyl nitrate in 5 milliliters of 1-octene was heated at reflux (114° C.) for 4¼ hours. The solvent was removed by evaporation under vacuum at 40° C. A yellow oil (0.80 gram) indicated by infrared to be 1-nitro-1-octene, remained.

EXAMPLE IV

A solution of 0.25 gram of 2,6-di-t-butyl-4-methylphenol and 0.25 milliliter (0.28 gram) of 1-nitro-2-octyl nitrate in 10 milliliters of dodecane was heated at 140–142° C. for 2 hours. Infrared analysis indicated that 1-nitro-1-octene formation was essentially complete after 1 hour.

EXAMPLE V

A 2.5% solution of 1-nitro-2-octyl nitrate in 1-dodecene was heated at 134–139° C. Infrared analysis indicated that after 1 hour the 1-nitro-2-octyl nitrate was 80% converted to 1-nitro-1-octene.

EXAMPLE VI

A solution of 1.50 grams of 1-nitro-2,4,4-trimethyl-2-pentyl nitrate in 22 milliliters of 1-octene was heated at reflux for 4½ hours. The solvent was removed by evaporation under vacuum at about 40° C. A brown liquid (1.36 grams) remained. By chromatography of the liquid on silica gel, and elution with 40% methylene chloride-60% isohexane, there was obtained 0.26 gram of 1-nitro-2,4,4-trimethyl-1-pentene.

EXAMPLE VII

A solution of 0.45 gram of 1-nitro-2,4,4-trimethyl-2-pentyl nitrate in 5.0 milliliters of 2,4,4-trimethyl-1- pentene was heated at reflux (104° C.) for 5 hours. The solvent was removed by evaporation under vacuum at 40° C. The yellow-orange oil which remained was analyzed by infrared and was found to contain 1-nitro-2,4,4-trimethyl-1-pentene.

EXAMPLE VIII 1-nitro-4-methyl-2-pentyl nitrate in the amount of 5 grams is dissolved in 100 milliliters of tetrahydrofuran, and 5 grams of potassium hydroxide is added thereto. The mixture is stirred at 10° C. for 1 hour and subsequently acidified with dilute HCl. 1-nitro-4-methyl-1-pentene is obtained by fractional distillation.

EXAMPLE IX 1-nitro-2-octadecyl nitrate (0.05 mole) is dissolved in 200 milliliters of methanol and sodium bicarbonate (0.1 mole) is added. The mixture is heated at reflux for 1 hour. After acidification and distillation, 1-nitro-1-octadecene is obtained.

EXAMPLE X 3-nitro-2-methyl-2-pentyl nitrate (0.05 mole) is heated at reflux in 150 milliliters of 1-octene for 2 hours. The solvent is removed by distillation, and 3-nitro-2-methyl-2-pentene is obtained.

EXAMPLE XI 1-nitro-2-methyl-2-hexyl nitrate (0.05 mole) is heated with 0.05 mole of 2,6-di-t-butyl-4-methyl-phenol in boiling chlorobenzene for 2 hours. The solvent is removed at reduced pressure, and 1-nitro-2-methyl-1-hexene is obtained by chromatography of the residue on silica gel.

We claim:
1. A method of preparing a nitroolefin having at least two carbon atoms which comprises providing a vicinal nitroalkyl nitrate having at least two carbon atoms and reacting said nitrate in a non-aqueous medium, said nitrate being at least slightly soluble in said medium, with a nitric acid acceptor selected from the group consisting of alumina hydrate, aluminum hydroxide, olefins having from 6 to 15 carbon atoms, copper stearate, phenol, 2,6 - di-t-butyl-4-methylphenol, 2,6 - di-t-butyl-4-hexylphenol and 4,4'-dihydroxy-3,3',5,5'-di-t-butyldiphenylmethane.
2. A method according to claim 1 wherein said acceptor to nitrate mole ratio is from 1:1 to 1:25.
3. A method according to claim 1 wherein said reacting is conducted at a temperature of from −40° C. to 300° C.
4. A method according to claim 1 wherein said reacting is conducted at a temperature of from 0° C. to 180° C.
5. A method according to claim 1 wherein said nitric acid acceptor is 1-octene.
6. A method according to claim 1 wherein said nitric acid acceptor is 1-dodecene.
7. A method according to claim 1 wherein said nitric acid acceptor is 2,4,4-trimethyl-1-pentene.
8. A method according to claim 1 wherein said non-aqueous medium is a $C_5$ to $C_{18}$ hydrocarbon.
9. A method according to claim 1 wherein the concentration of said nitrate in said medium is from 0.1 to 50 weight percent nitrate.
10. A method according to claim 1 wherein the concentration of said nitrate in said medium is from 2 to 20 weight percent nitrate.
11. A method according to claim 8 wherein said hydrocarbon is benzene.
12. A method according to claim 8 wherein said hydrocarbon is 1-octene.
13. A method according to claim 1 wherein said non-aqueous medium is tetrahydrofuran.
14. A method according to claim 1 wherein said non-aqueous medium is methanol.
15. A method according to claim 8 wherein said hydrocarbon is dodecane.
16. A method according to claim 1 wherein said nitroolefin is 1-nitro-2,4,4-trimethyl-1-pentene.
17. A method according to claim 1 wherein said nitroolefin is 1-nitro-1-octene.
18. A method according to claim 1 wherein said nitroolefin is 1-nitro-4-methyl-1-pentene.
19. A method according to claim 1 wherein said nitroolefin is 1-nitro-1-octadecene.
20. A method according to claim 1 wherein said nitroolefin is 3-nitro-2-methyl-2-pentene.
21. A method of preparing a nitroolefin corresponding to the formula:

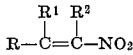

where R is a hydrogen or an alkyl group having from 1 to 22 carbon atoms and where $R^1$ and $R^2$ are hydrogen or alkyl groups having from 1 to 10 carbon atoms which comprises:
providing a vicinal nitroalkyl nitrate having at least two carbon atoms corresponding to the formula:

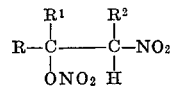

where R, $R^1$ and $R^2$ are as hereinabove defined, and
reacting said nitrate at a temperature of from 0 to 180° C. in a $C_5$ to $C_{18}$ hydrocarbon medium with alumina hydrate, wherein said alumina hydrate to said nitrate mole ratio is from 1:1 to 1:5.

References Cited

UNITED STATES PATENTS 2,460,243   1/1949   Scaife et al. _____ 260—644
3,240,823   3/1966   Bonetti et al. _____ 260—644

OTHER REFERENCES

Perekalin, Unsaturated Nitro Compounds, Daniel Davey & Co., New York, 1964, pp. 15 to 17, 20 to 22 and 30 to 33.

LELAND A. SEBASTIAN, Primary Examiner

U.S. Cl. X.R.
424—349